Mar. 6, 1923.                    J. C. PREWITT.                    1,447,323.
                                ROAD MAP HOLDER.
                                FILED OCT. 6, 1922.

INVENTOR.
J. C. Prewitt
By
ATTORNEYS.

Patented Mar. 6, 1923.

1,447,323

UNITED STATES PATENT OFFICE.

JOHN C. PREWITT, OF SANTA MARGARITA, CALIFORNIA.

ROAD-MAP HOLDER.

Application filed October 6, 1922. Serial No. 592,828.

*To all whom it may concern:*

Be it known that I, JOHN C. PREWITT, a citizen of the United States, and a resident of Santa Margarita, county of San Luis Obispo, State of California, have invented a new and useful Road-Map Holder, of which the following is a specification.

The present invention relates to improvements in road map holders adapted to be used by drivers of motor vehicles for supporting a map or the like in plain view so that they may be enabled to study the map while driving the car. The road map holder may be supported in any convenient place in front of the driver and is arranged in such a manner that a map consisting preferably of a single sheet of rather stiff paper may be conveniently inserted and held in place. The holder is furthermore arranged in such a manner that a map cut in the usual manner, that is in the form of a blotter, may be inserted lengthwise or transversely. The present device constitutes an improvement over a road map holder described in my co-pending application, Serial No. 559355.

Figure 1:
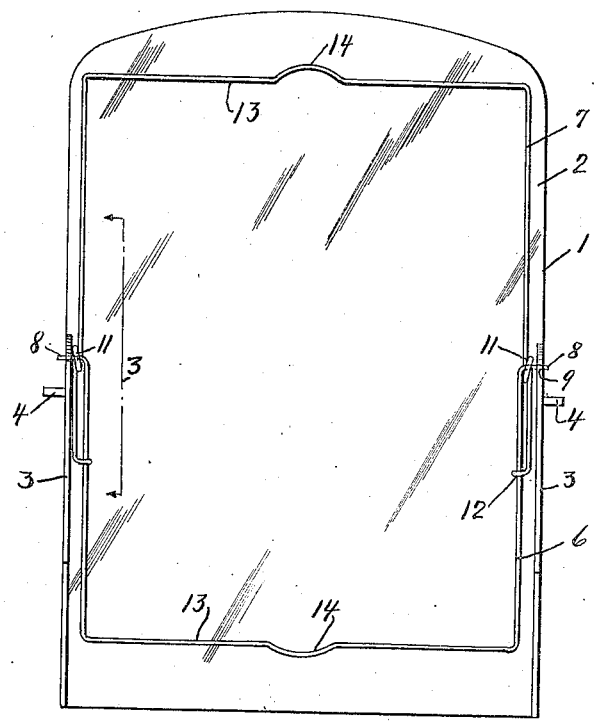
Figure 2:
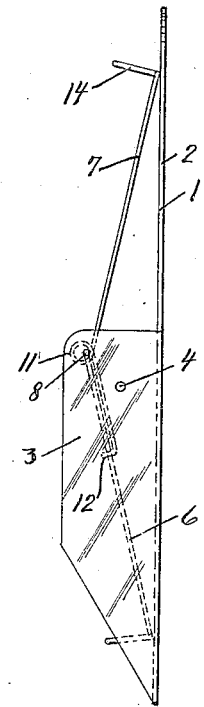
Figure 3:
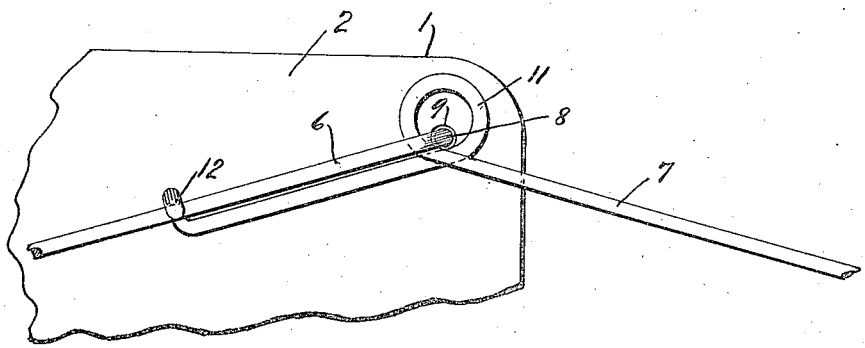

The preferred form of my invention is shown in the accompanying drawing in which Figure 1 represents a top plan view of the same, Figure 2 a side view of the same and Figure 3 an enlarged detail view illustrating a certain spring arrangement. While I have shown only the preferred form of the invention it should be understood that various changes or modifications may be made within the scope of the claims hereto attached without departing from the spirit of the invention.

My road map holder (1) consists of a flat back (2) of sufficient width to allow a road map to be supported thereon lengthwise and to be confined between the two marginal flanges (3) rising from the back in spaced and parallel relation. The map holder may be supported between two bearings, not shown in the drawing, by means of external pins (4) emanating from the marginal flanges.

The map is held in place by means of two U-shaped springs (6) and (7). The extreme ends (8) of the former spring member are turned outwardly and extend through perforations (9) in the marginal flanges which latter perforations are preferably arranged centrally relative to the longitudinal extension of the back. The ends (11) of the second spring member (7) are coiled around the turned extremities of the spring member (6) and extending beyond the coil engage an intermediate portion of the legs of the spring member (6) as shown at (12) for exerting downward pressure on the bases (13) of both spring members, which hold the map in place by means of this downward pressure. Each base is provided with a loop (14) preferably in its center for facilitating the handling of the same. The marginal flanges (3) do not extend throughout the whole length of the base but stop in the central portion of the same leaving one half of the base free to receive the road map in a transverse position.

The operation of the device will be readily understood from the foregoing description. To insert a map lengthwise it is only necessary to raise the bases (13) of the two spring members and to slip the map underneath the same when the pressure exercised by the spring members will hold the map in place. In a similar manner the map may be inserted transversely under one of the spring members and will be held in place by its downward pressure.

I claim:

1. A road map holder of the character described comprising a flat back, marginal flanges rising therefrom in spaced relation and spring means for holding a flat object to the back consisting of a U shaped member having its extreme ends turned outwardly and supported in the marginal flanges and a second U shaped member having its ends coiled around the turned ends of the first member and engaging an intermediate portion of the legs of the latter member for exerting a downward pressure on the bases of both U shaped members.

2. A road map holder of the character described comprising a flat back, marginal flanges rising therefrom in spaced relation and spring means for holding a flat object to the back consisting of a U shaped member having its extreme ends turned outwardly and supported in the marginal flanges and a second U shaped member having its ends coiled around the turned ends of the first member and engaging an intermediate portion of the legs of the latter member for exerting a downward pressure on the bases of both U shaped members, central loops being provided in the bases for facilitating the handling of the same.

JOHN C. PREWITT.